June 17, 1958 E. B. LIVINGSTON ET AL 2,839,310
COLLAPSIBLE CART

Filed Dec. 31, 1956 2 Sheets-Sheet 1

INVENTOR.
Edwin B. Livingston and
BY Richard W. Livingston.

Fishburn and Gold
ATTORNEYS.

June 17, 1958 — E. B. LIVINGSTON ET AL — 2,839,310
COLLAPSIBLE CART
Filed Dec. 31, 1956 — 2 Sheets-Sheet 2
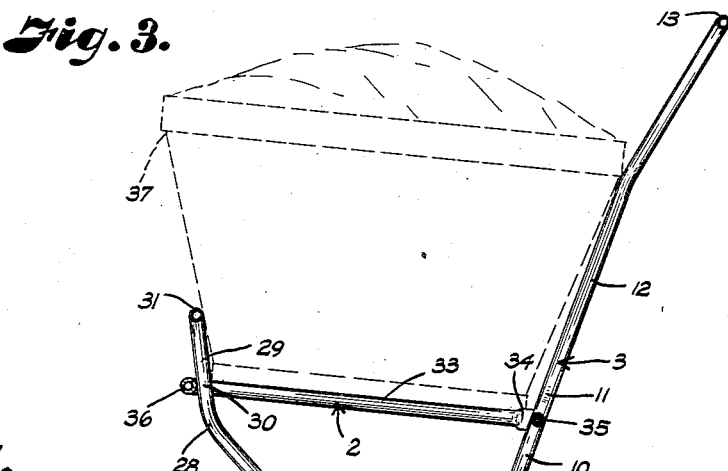
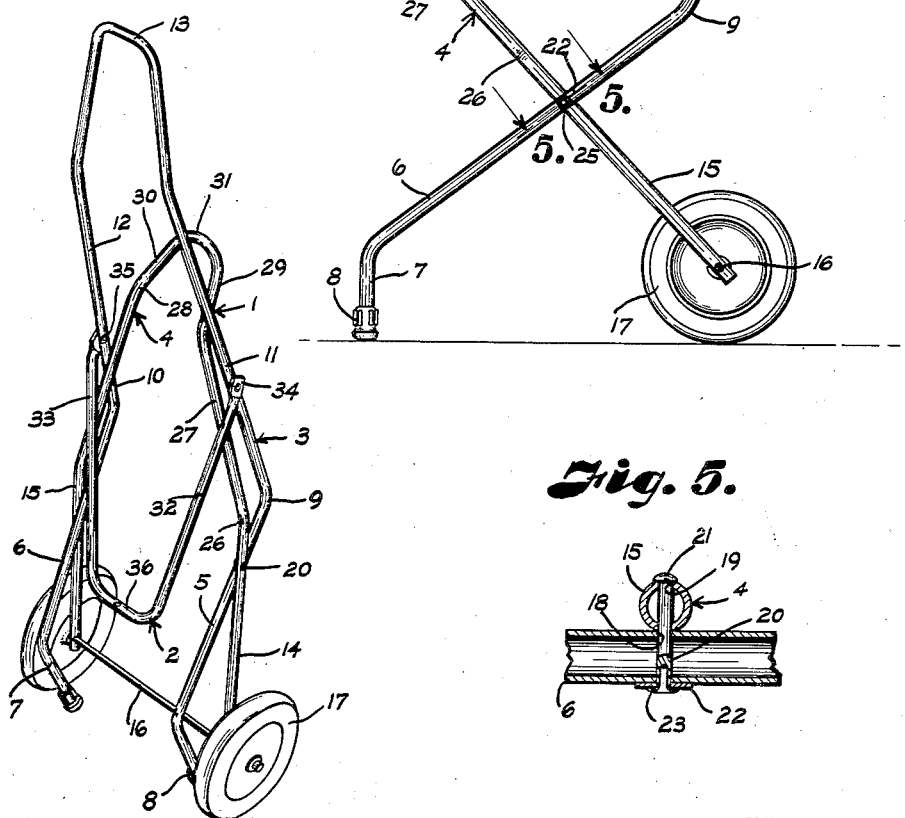
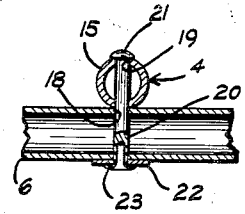
INVENTOR.
Edwin B. Livingston and
BY Richard W. Livingston.
Fishburn and Gold
ATTORNEYS.

United States Patent Office 2,839,310
Patented June 17, 1958

2,839,310

COLLAPSIBLE CART

Edwin B. Livingston and Richard W. Livingston, Jackson County, Mo.

Application December 31, 1956, Serial No. 631,919

5 Claims. (Cl. 280—41)

This invention relates to carts for supporting and transporting articles, and more particularly to a collapsible or foldable cart structure.

The principal objects of the present invention are to provide a collapsible cart structure with hingedly connected legs and a hingedly mounted load support with cooperating interengaging portions for retaining the cart in erected load-carrying position; to provide such a cart with wheels on rearmost legs whereby the cart may be tilted and wheeled for ease of transportation of loads thereon; to provide such a cart structure wherein the load thereon cooperates with the portions of the cart to hold same in erected position; to provide such a cart adapted to be fabricated of tubular material to form a sturdy, lightweight, easily movable structure that is quickly erected and easily collapsed by the operator grasping and moving the handle and load support.

In accomplishing these and other objects of the present invention, we have provided improved details of structure, the preferred form of which is illustrated in the accompanying drawings, wherein:

Fig. 3 is a vertical sectional view through the cart on the line 3—3, Fig. 2.

Fig. 4 is a perspective view of the cart in collapsed position.

Fig. 5 is a sectional view through the hinge connection of the legs on the line 5—5, Fig. 3.

Figure 1:
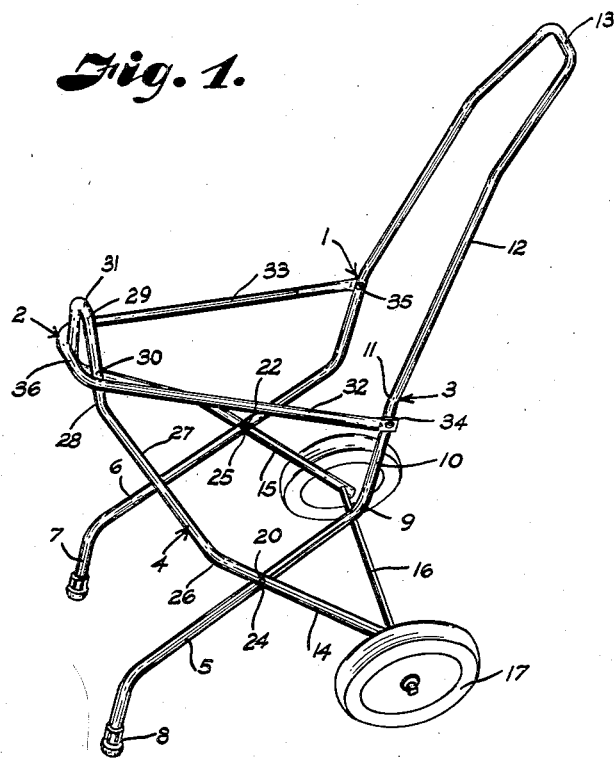
Fig. 1 is a perspective view of the collapsible cart in erected position.

Referring more in detail to the drawings:

1 designates a collapsible cart generally consisting of a load support 2 mounted on a frame 3 for swinging action relative thereto and having portions adapted to interlock with portions of a frame 4 that is hingedly connected with the frame 3. The frames 3 and 4 are each preferably formed of a single length of tubular metal for lightness in weight. The frame 3 includes laterally spaced substantially parallel leg portions 5 and 6 having at their lower ends downwardly turned portions 7 provided with ground-engaging feet 8 at the lower ends thereof. The feet 8 preferably are of resilient material such as rubber cane tips or the like. The legs 5 and 6 are turned upwardly as at 9 forming leg extensions 10 that are bent inwardly and rearwardly as at 11 to form upwardly and rearwardly converging side members 12 connected at their upper ends by a cross member 13. Various handle structures may be arranged on the side members 12; however, it is preferred that the cross member 13 form the handle for the cart.

Figure 2:
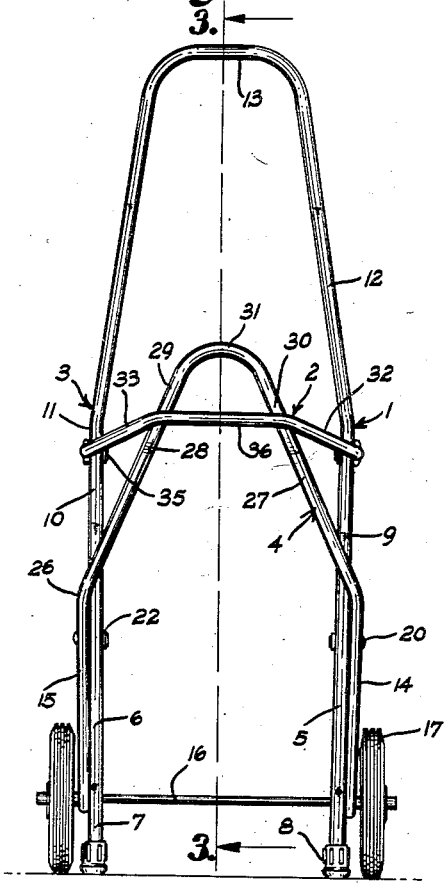
Fig. 2 is a front elevation of the erected cart.

The frame 4 includes parallel leg members 14 and 15 preferably arranged on the outside of the legs 5 and 6 as shown in Figs. 1 and 2. The lower ends of the legs 14 and 15 are connected by an axle 16 which extends laterally of the leg portions 14 and 15 and suitable wheels 17 are rotatably mounted on the axle 16 laterally outwardly of the legs 14 and 15.

The legs of the frames 3 and 4 are suitably hingedly connected intermediate their ends for relative swinging movement of said frames. In the illustrated structure, the legs 5 and 6 are provided with aligned transverse bores 18 which also align with transverse bores 19 in the legs 14 and 15, the bores 18 and 19 being intermediate the ends of the respective legs. Suitable pins 20 extend through the bores 18 and 19 of the legs 5 and 14 and the legs 6 and 15 respectively to provide a hinged connection therefor. In the illustrated structure, the pins 20 have heads 21 on one end that engages the adjacent leg and the other end has a washer 22 thereon and the end of the pin riveted over as at 23 or otherwise suitably provided with a fastening device to retain same in assembled position. The hinge pins 20 hingedly connect the legs to provide laterally spaced pairs of legs 24 and 25, as illustrated in Fig. 1. The legs 14 and 15, forwardly and upwardly of the hinge connections thereof, are bent as at 26 to form upwardly and forwardly converging extensions 27 that are turned upwardly as at 28 and terminate in an upstanding member 29 having upwardly and inwardly inclined portions 30 that are connected by an arcuate portion or cross bar portion 31, as illustrated in Figs. 1 and 2. The portions 30 and 31 cooperate to define the substantially upstanding forward end 29 on the frame 4 spaced forwardly from the extensions 10 of the frame 3, as illustrated in Figs. 1 and 3, when in erected position.

The load support 2 is preferably formed of a single length of tubular metal for lightness in weight and has laterally spaced side members 32 and 33 which have flattened rear ends 34 hingedly connected as by pins 35 adjacent the upper portion of the leg extensions 10. The side members 32 and 33 converge forwardly and inwardly from said rear ends and the forward ends are connected by a cross bar 36 spaced from the extensions whereby when in erected position the cross bar will engage the forward side of the upstanding portion or member 29 of the frame 4. The spacing at the forward ends of the side members 32 and 33 adjacent the cross bar 36 in such that the upstanding portion of the frame 4 will extend therebetween and when in erected position said forward portions of the side members will engage the portions 30 adjacent the bends 28 to limit downward swinging movement of the load support 2. It is preferable that the cart be of suitable size for supporting a bushel basket or other article 37 to be carried on the load-supporting member whereby said article will engage the upstanding portion 29 of the frame 4 and the side members 12 of the frame 3, as illustrated in Fig. 3.

In using a cart constructed and assembled as described, and assuming the cart to be in erected position, the load is placed on the load-supporting member 2, the handle 13 grasped and the structure tilted rearwardly to raise the feet 8 from the ground whereby the cart may be wheeled to any desired location. When the cart is unloaded, and it is desired to store same, the article 37 is removed from the load support 2, the handle 13 is grasped and the frame 3 tilted forwardly with the feet 8 engaging the ground whereby the wheels 17 are raised from the ground. Then the load support 2 is swung upwardly to disengage the forward portion thereof from the upstanding portion 29 of the frame 4 which allows the wheels 17 to swing downwardly. Then upon further forward tilting of the frame 3, the frame 4 will swing relative thereto to a position substantially shown in Fig. 4. Then the load support 2 is released to swing downwardly to the position shown in Fig. 4 whereby the cart is in collapsed position requiring a minimum of storage space. In collapsed position, the handle 13 may be engaged with a suitable hanger whereby the collapsed cart will lie close to a wall or the like.

When it is desired to erect the cart, it is removed from its place of storage, the wheels 17 placed on the ground, the load-supporting member 2 is swung upwardly and then by downward and rearward pressure on the handle 13, the pairs of legs will be hinged to spread the lower ends thereof and the load support simultaneously is swung downwardly to substantially its erected position to effect the interlock between the upstanding portion 29 of the frame 4 and the forward end of the load-supporting structure 2. Then an article 37 to be carried thereon is placed on the load support.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A collapsible cart comprising, laterally spaced pairs of leg members with the legs of each pair hingedly connected intermediate their ends whereby one leg of each pair is inclined downwardly and forwardly and the other leg of each pair is inclined downwardly and rearwardly from said hinged connection when in erected position, wheels at the lower ends of said other legs, said one leg of each pair having a ground engaging member on the lower end thereof, forwardly and upwardly extending portions on said other legs above said hinge connections and terminating in upwardly turned converging portions connected at the upper ends thereof, upwardly and rearwardly extending sections on said one leg of each pair above said hinge connection, a handle member connecting the upper ends of said sections, a load support having side members hinged at their rear ends to said sections in upwardly spaced relation to the hinge connections of the pairs of legs, said side members extending forwardly of the hinge thereof, and a crossbar connecting the forward ends of said side members, the width of the upper ends of the upturned converging portions on said upwardly and forwardly extending portions of said other legs being slightly less than the spacing between said side members adjacent the crossbar of the load support and the distance of said upturned portions from the hinged rear ends of the side members being slightly less than the length of said side members whereby said upwardly turned converging portions extend upwardly between the side members of the load support and engage the crossbar and said side members rest on said converging portions providing a separable engagement to retain the cart in load carrying position.

2. A collapsible cart comprising, laterally spaced pairs of leg members with the legs of each pair hingedly connected intermediate their ends whereby one leg of each pair is inclined downwardly and forwardly and the other leg of each pair is inclined downwardly and rearwardly from said hinged connection when in erected position, an axle at the lower ends of said other legs, wheels carried by said axle, said one leg of each pair having a ground engaging member on the lower end thereof, forwardly and upwardly converging portions on said other legs above said hinge connections and terminating in upwardly turned portions connected at the upper ends thereof, upwardly and rearwardly extending sections on said one leg of each pair above said hinge connection, a cross member connecting the upper ends of said sections and forming a handle, a load support having side members hinged at their rear ends to said sections in upwardly spaced relation to the hinge connections of the pairs of legs, said side members converging forwardly of the hinge thereof, and a crossbar connecting the forward ends of said side members, the width of the upturned portions at the upper ends of the converging portions of said other legs being slightly less than the spacing between said side members adjacent the crossbar of the load support and the distance of said upturned portions from the hinged rear ends of the side members being slightly less than the length of said side members whereby said upwardly turned portions extend upwardly between the side members of the load support and said side members rest on the upwardly converging portions of said other legs to provide a separable engagement retaining the cart in erected position.

3. A collapsible cart comprising, laterally spaced pairs of leg members with the legs of each pair hingedly connected intermediate their ends whereby one leg of each pair is inclined downwardly and forwardly and the other leg of each pair is inclined downwardly and rearwardly from said hinged connection when in erected position, wheels at the lower ends of said other legs, forwardly and upwardly extending portions on said other legs above said hinge connections and terminating in an upwardly extending member with upwardly converging sides, upwardly and rearwardly extending sections on said one leg of each pair above said hinge connection, a handle on said sections, and a load support having side members hinged at their rear ends to said sections in upwardly spaced relation to the hinge connections of the pairs of legs, said side members extending forwardly of the hinge thereof, a crossbar connecting the forward ends of said side members, said converging sides of the upwardly extending member on said other legs being of a width at the upper ends thereof less than the spacing between the side members of the load support whereby said upwardly extending member extends between said side members and said side members rest on said converging sides providing a separable engagement when the cart is erected for retaining the cart in erected position.

4. A collapsible cart comprising, laterally spaced pairs of leg members, means hingedly connecting the leg members of each pair intermediate the ends thereof whereby portions of one leg of each pair is inclined downwardly and forwardly and portions of the other leg of each pair is inclined downwardly and rearwardly from said hinge means when in erected position, an axle at the lower ends of said other legs, wheels carried by said axle, said one leg of each pair having portions extending upwardly and rearwardly from the hinge means, a handle member connecting the upper ends of said upwardly extending portions of said one leg of each pair, a load support having side members hinged at their rear ends to the upwardly extending portions of said one leg of each pair, a crossbar connecting the forward ends of said side members, and portions on said other legs of each pair extending upwardly and forwardly from said hinge means and terminating in upwardly turned converging portions connected at the upper ends thereof, said upwardly turned portions being of less width than the spacing between the side members adjacent the crossbar whereby said upturned portions extend between said side members, said upwardly and forwardly extending portions on said other legs at the lower ends of said upwardly turned converging portions being of greater width than the spacing between said side members adjacent the crossbar and said side members rest on said converging portions for supporting said load-supporting member in erected position, said crossbar engaging the upwardly turned portion whereby weight on the load support and the engagement of the forward end thereof with said upstanding portion will retain the cart in erected position.

5. A collapsible cart comprising, laterally spaced pairs of leg members, means hingedly connecting the leg members of each pair intermediate the ends thereof whereby portions of one leg of each pair is inclined downwardly and forwardly and portions of the other leg of each pair is inclined downwardly and rearwardly from said hinge means when in erected position, an axle at the lower ends of said other legs, wheels carried by said axle, said one leg of each pair having a ground engaging member on the lower end thereof, said one leg of each pair having portions extending upwardly and rearwardly from said hinge means, a handle member connecting the upper ends of said upwardly extending portions of said one leg of each pair, a load support having side members hinged at their rear ends to the upwardly extending portions of said one leg of each pair, a crossbar connecting the forward ends of said side members, and portions on said other legs of each pair extending upwardly and forwardly from said hinge means and terminating in upwardly turned converging portions connected at the upper ends thereof, said upwardly turned portions being of less width than the spacing between the side members adjacent the crossbar whereby said upwardly turned portions extend between said side members, said upwardly and forwardly extending portions on said other legs at the lower ends of said upwardly turned portions being of greater width than the spacing between said side members adjacent the crossbar and said side members rest on said converging portions for supporting said load-supporting member in erected position, said crossbar engaging the upwardly turned portion whereby weight on the load support and the engagement of the forward end thereof with said upstanding portion will retain the cart in erected position and lifting of the load support from said upstanding converging portion on said other legs and lifting of the handle causes swinging of said other legs whereby the wheels approach the lower ends of said one leg and release of the load support will cause downward swinging thereof to substantially overlie said one leg.

References Cited in the file of this patent

UNITED STATES PATENTS

| | | |
|---|---|---|
| 1,642,731 | Hagberg | Sept. 20, 1927 |
| 1,764,914 | Vande Mark | June 17, 1930 |
| 2,544,220 | Concklin | Mar. 6, 1951 |
| 2,787,996 | Rumsey | Apr. 9, 1957 |